March 6, 1934.  M. F. FOGLER  1,949,462

PROCESS FOR THE UTILIZATION OF NITROGEN OXIDE GASES

Filed May 14, 1930  2 Sheets-Sheet 1

INVENTOR
*Mayor Farthing Fogler*
BY
ATTORNEY

March 6, 1934.   M. F. FOGLER   1,949,462
PROCESS FOR THE UTILIZATION OF NITROGEN OXIDE GASES
Filed May 14, 1930   2 Sheets-Sheet 2

INVENTOR
Mayor Farthing Fogler
BY
ATTORNEY

Patented Mar. 6, 1934

1,949,462

UNITED STATES PATENT OFFICE 1,949,462

PROCESS FOR THE UTILIZATION OF NITROGEN OXIDE GASES

Mayor Farthing Fogler, Petersburg, Va., assignor to Atmospheric Nitrogen Corporation, New York, N. Y., a corporation of New York Application May 14, 1930, Serial No. 452,299

35 Claims. (Cl. 23—102)

This invention relates to a process for the utilization of gases containing nitrogen oxides. More particularly, this invention relates to the production of nitrates and nitric acid from nitrogen oxides, alkaline solutions, water and oxygen, and to specific steps of that process.

By means of well known processes a nitrate may be prepared by the treatment of alkaline solutions with nitrogen oxide gases, such as are obtained from the catalytic oxidation of ammonia with air or oxygen or from the treatment of air in an electric arc. It has been proposed to pass such nitrogen oxide gases through a series of towers countercurrent to a flow of an alkaline solution, for example sodium carbonate solution. The nitrogen oxides entering the first of such a series of towers with respect to the flow of the sodium carbonate solution, are absorbed in the fresh sodium carbonate, and a solution of sodium nitrite containing a greater or smaller amount of sodium nitrate is produced. This solution of sodium nitrite is passed through the succeeding towers in the series where it is contacted with fresh nitrogen oxide gases, for example a gas coming from an ammonia oxidation catalyst which has been treated so that the nitrogen oxides are principally in the form of nitrogen tetroxide ($N_2O_4$ or a mixture of gases corresponding to the formulas $N_2O_4$ and $NO_2$) and the sodium nitrite content of the solution is converted to sodium nitrate by the nitrogen tetroxide. It has also been proposed to produce concentrated nitric acid by refrigerating dilute nitrogen oxide gases containing nitrogen tetroxide to condense out the nitrogen tetroxide as a liquid and then to treat this liquid nitrogen tetroxide under pressure with water and oxygen to produce a concentrated nitric acid product. Such a process requires the refrigerating of relatively large volumes of gases in order to condense therefrom their content of nitrogen tetroxide and thus requires the construction of large and expensive apparatus in order to handle the large quantities of gas required for the recovery of a given amount of liquid nitrogen tetroxide and a costly refrigeration of the large volume of gases with which the nitrogen tetroxide is admixed.

It is an object of this invention to provide a process for the economical concentration of a dilute nitrogen oxide gas. It is a further object of this invention to provide a process for the treatment of a dilute nitrogen tetroxide gas with an alkaline solution whereby a solution of a nitrate is obtained and to utilize the process for obtaining a nitrate for the recovery of a concentrated nitrogen oxide gas from the dilute nitrogen oxide gas. It is a further object of this invention to provide an economical process for the manufacture both of a nitrate and of nitric acid in which the steps employed for the production of the nitrate serve as a means for the production of a concentrated nitrogen oxide gas particularly suitable for the production of liquid nitrogen tetroxide which is employed in obtaining a concentrated nitric acid product.

Other objects of the invention will in part be obvious and will in part appear hereinafter.

I have discovered in the oxidation of a solution containing a nitrite with a gas containing nitrogen tetroxide diluted with other gases that upon separating the solution from unabsorbed gas and retaining it thus separated for a period of time, a concentrated nitrogen oxide gas is evolved in substantial amounts and which, for example, may correspond to as much as 20% or more of the nitrogen tetroxide introduced in the form of a dilute gas.

I have further discovered that by oxidizing the nitrite content of a solution with a dilute nitrogen tetroxide gas in a plurality of stages and by separating the solution between such stages from unabsorbed gas and retaining the thus separated solution between the stages for a period of time before passing it to a succeeding stage, a concentrated nitrogen oxide gas is evolved in an increased amount.

My invention comprises the treatment of a solution of a nitrite with a dilute nitrogen tetroxide gas to convert the nitrite into nitrate. The solution is treated for the recovery therefrom of a concentrated nitrogen oxide gas and the unabsorbed gases are absorbed in an alkaline solution to produce the solution containing the nitrite. The concentrated nitrogen oxide gas, after the addition of oxygen and treatment to convert lower oxides to nitrogen tetroxide, is cooled and nitrogen tetroxide condensed as a liquid. The liquid nitrogen tetroxide is separated from the uncondensed gases and treated with water and oxygen to form a concentrated nitric acid product.

While the mechanism of the reactions underlying this method of preparing concentrated nitrogen oxide gas is not known with exactness, it is, however, believed that the evolution of a nitrogen oxide gas in concentrated form from a nitrate solution which has been obtained by oxidation of a nitrite with nitrogen tetroxide diluted with other gases is due to the unequal reaction rates of the oxidation of nitrite to nitrate and of the decomposition of unstable nitrous acid with the formation of nitric oxide. Thus the reactions for converting sodium nitrite to sodium nitrate which may be expressed by the following equations $$N_2O_4 + H_2O = HNO_3 + HNO_2$$

$$NaNO_2 + HNO_3 = NaNO_3 + HNO_2$$

proceeds at a higher rate of speed than that for the decomposition of nitrous acid formed by these reactions and which may be expressed by the equation $$3HNO_2 = HNO_3 + H_2O + 2NO$$

and accordingly it is believed that by retaining the reaction mixture which has been separated from unabsorbed gases for a period of time, in a space separated from the oxidation space and provided with means for collecting the gas, the decomposition of nitrous acid proceeds with the result that a concentrated nitric oxide gas is recovered in substantial amounts and may be utilized as desired, for example, for the production of concentrated nitric acid.

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention, reference should be had to the following detailed description taken in connection with the accompanying drawings in which:

Fig. 4 shows graphically the effect of temperature upon the reaction between water, oxygen and liquid nitrogen tetroxide.

Figure 1:
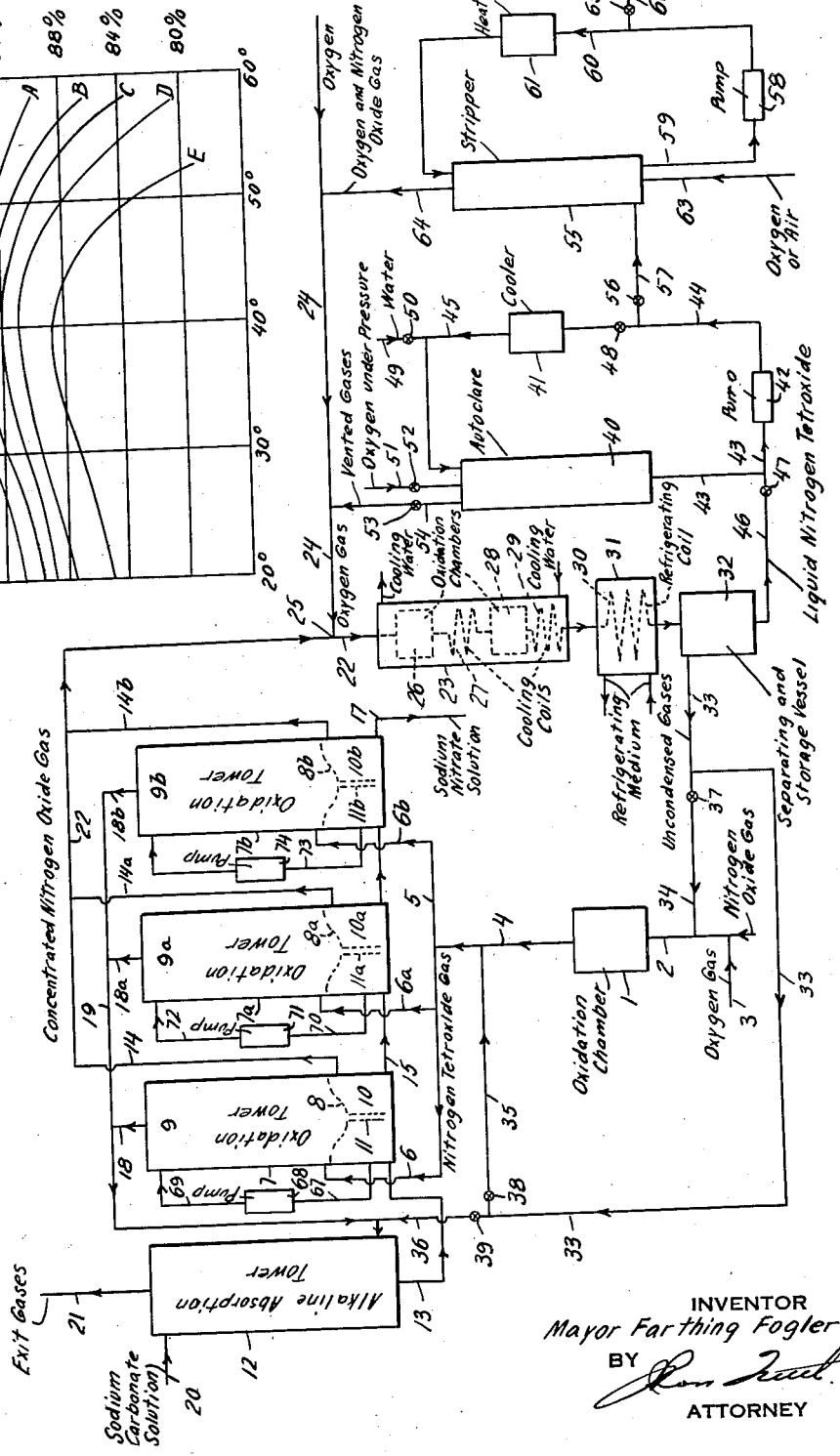
Fig. 1 illustrates diagrammatically, one modification of this invention when employed for the production of sodium nitrate and nitric acid.
Figure 2:
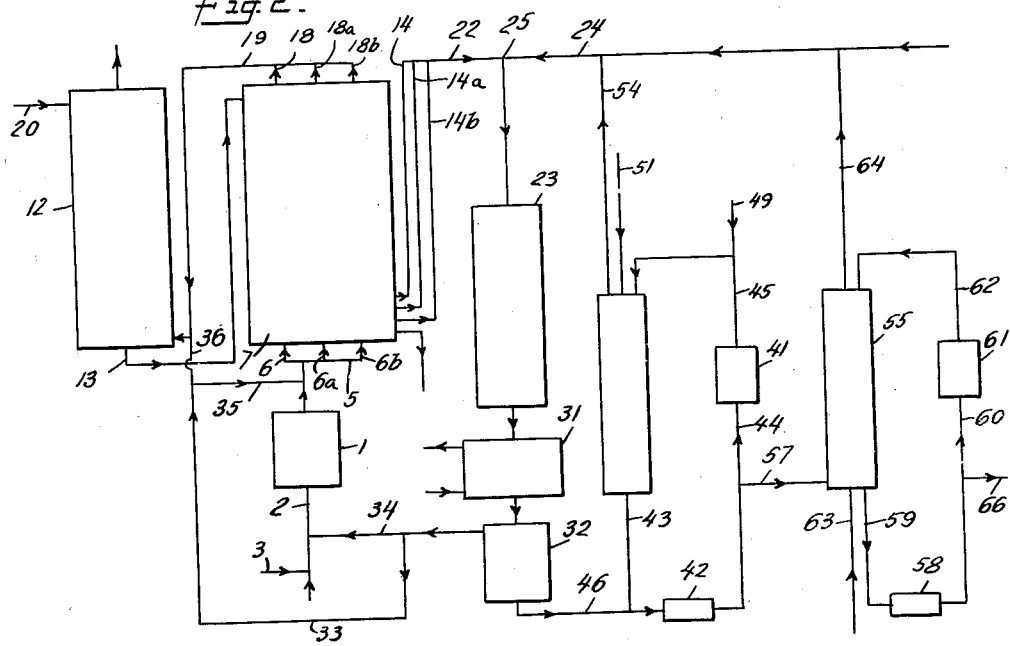
Fig. 2 is a simplified representation of the modification of the invention shown in Fig. 1.

Referring to Figs. 1 and 2, the numeral 1 indicates an oxidation chamber into which a nitrogen oxide gas is passed through a pipe 2. This nitrogen oxide gas may be, for example, the gas obtained by the catalytic oxidation of ammonia with air or oxygen or in any other suitable manner. If the nitrogen oxide gas contains insufficient oxygen to convert substantially all of the nitrogen oxides into nitrogen tetroxide, an oxygen gas, such as air or oxygen, may be mixed therewith, for example by being admitted to pipe 2 through a pipe 3. In the oxidation chamber 1 the nitrogen oxides in the gas are oxidized into nitrogen tetroxide. A suitable degree of oxidation is, for example to about 80% nitrogen tetroxide although this oxidation may be carried to a greater or less degree as is desired. If the nitrogen oxide gases passed to the oxidation chamber 1 are at a high temperature, as for example the gases leaving the heat exchangers of an ammonia oxidation system, provision for cooling the gases to a temperature suitable for the oxidation of the nitrogen oxides to nitrogen tetroxide, for example to 40° C., either before their introduction into chamber 1 or in chamber 1, may be made. This cooling may be accomplished by directly contacting the gases within the chamber with cool dilute nitric acid or in any other desired manner. If a suitable nitrogen tetroxide gas is available without treatment in the oxidation chamber 1 as above described, such a gas may be employed in the process in the same way as is described below for the oxidized gas from this chamber.

The nitrogen tetroxide gas from the oxidation chamber passes by way of pipe 4 to a header pipe 5 and from this header pipe a plurality of separate portions of the gas are passed through pipes 6, 6a and 6b to the bottom portions of a plurality of oxidation towers 7, 7a and 7b. As is diagrammatically indicated in the drawings, each of the oxidation towers is divided into two parts by a diaphragm 8, 8a or 8b. Above the diaphragm is a chamber 9, 9a or 9b which preferably contains a packing material such as coke, whereby liquid and gas passing countercurrently through the chamber are brought into intimate contact with each other. The bottom portion of each of the oxidation towers 7, 7a and 7b, below diaphragms 8, 8a and 8b, comprises a sump 10, 10a or 10b. Communication between chamber 9, 9a and 9b and sump 10, 10a and 10b respectively, is established by means of a pipe 11, 11a or 11b which opens through diaphragm 8, 8a or 8b and depends below the normal liquid level in the sump 10, 10a or 10b. Pipes 6, 6a and 6b enter their respective oxidation tower at a point above the diaphragm 8, 8a or 8b.

A solution of sodium nitrite, which may or may not contain sodium nitrate prepared as hereinafter described in an absorption tower 12, is passed from tower 12 through a pipe 13 to within the sump 10 of tower 7 whence the solution is passed through pipes 67 and 69 by means of pump 68 to the top of tower 7 and sprayed over the packing material in the tower in any well known manner. The solution of sodium nitrate descending through this tower is intimately contacted with the portion of the nitrogen tetroxide gas from pipe 5 admitted to this tower by way of pipe 6 and the sodium nitrite is oxidized to sodium nitrate. The solution passes from chamber 9 through pipe 11 into sump 10 and out of contact with the dilute gases in chamber 9. It is in sump 10, and similar sumps in similar towers that concentrated nitrogen oxides are obtained by retaining the liquor therein for a period of time out of contact with the dilute gases in chamber 9 whereby nitrogen oxides are evolved and collect in the upper portion of the sump from which they may be withdrawn through a pipe 14 as a concentrated nitrogen oxide gas. I have found that the gas thus recovered contains, for example, from 92% to 96% nitric oxide by volume, the remainder being principally water vapor. The solution in sump 10 is recirculated together with solution from tower 12 which enters the sump through pipe 13.

A portion of the solution in sump 10 from which the nitrogen oxides have been recovered is passed through pipe 15 to within the sump of tower 7a where it mingles with the liquor therein and is passed through pipes 70 and 72 by means of pump 71 to the top of tower 7a and is sprayed over the packing material in chamber 9a of this tower. In flowing downwardly through tower 7a, the solution passes in contact with the portion of nitrogen tetroxide gas admitted to the tower from pipe 5 by way of pipe 6a and a further quantity of sodium nitrite is oxidized to sodium nitrate. The liquor after passing through chamber 9a, flows through pipe 11a to sump 10a in which, as in sump 10, nitrogen oxides contained in the liquor are liberated and collected in the upper portion of the sump as a concentrated nitrogen oxide gas, whence they may be withdrawn through a pipe 14a. The solution in sump 10a is recirculated through tower 7a while a portion of the solution is withdrawn and passed through a pipe 16 into the sump of tower 7b. In this tower the solution is treated in a similar manner as in towers 7 and 7a with a portion of the nitrogen tetroxide gas from pipe 5 passed into tower 7b through pipe 6b. The liquor flows into sump 10b, in which, as in the other sumps, nitrogen oxides are evolved and recovered in concentrated form, and may be withdrawn through a pipe 14b, and the liquor which has now had substantially all of its original sodium nitrite content oxidized by the treatment in towers 7, 7a and 7b is withdrawn from sump 10b through a pipe 17 and may be treated in any desired manner to recover sodium nitrate therefrom. The solution during its passage through towers 7, 7a and 7b should be maintained at a suitable temperature, for example below about 40° C., which may be accomplished in any well known manner.

It is, of course, evident that instead of employing the sumps 10, 10a and 10b as a part of oxidation towers 7, 7a and 7b in which, to retain the solution from which unabsorbed gases have been separated in order to bring about the evolution of the nitrogen oxide gases in concentrated form, the solution containing nitrogen oxides may be withdrawn from the oxidation towers and treated in separate vessels for the recovery of its nitrogen oxide content. I have found that in a process in which the nitrogen oxide is recovered from a sump in the bottom of the oxidation towers, as shown in Fig. 1, when the liquor is allowed to remain in the sump for a prolonged period of time, for example, an average period of about four minutes, i. e. when the volume of liquor maintained in the sump is four times the volume of liquor removed therefrom every minute, a satisfactory recovery of the nitrogen oxides is obtained. The evolution of the nitrogen oxides may be facilitated either in sumps 10, 10a and 10b or in separate vessels by heating the solution or by subjecting the solution to a decreased pressure below the pressure at which the sodium nitrite was oxidized to sodium nitrate.

When it is said that the solution from chambers 9, 9a and 9b contains nitrogen oxides or that it contains absorbed nitrogen oxides, it is to be understood that no distinction is made between nitrogen oxides which may be mechanically held in solution and nitrogen oxides which may be in unstable chemical combination in the solution for example, as nitrous acid, i. e., by the nitrogen oxide content of the solution is meant the nitrogen oxides which the solution will spontaneously give up with or without heating or subjecting it to a reduced pressure, and which may be recovered therefrom as a gas after the solution is separated from the dilute nitrogen tetroxide gas used in its preparation.

The residual gases, unabsorbed by the nitric solution during their passage upwardly through chambers 9, 9a and 9b of the oxidation towers, are withdrawn from the top of the towers and are passed through pipes 18, 18a and 18b respectively, to a header pipe 19 where they are merged and passed to the bottom of absorption tower 12 and thence upwardly through tower 12 and in intimate contact with a solution of sodium carbonate which is admitted to the top of tower 12 from a pipe 20. The solution of sodium carbonate passes downwardly through tower 12 in contact with the gases therein and absorbs from the gases nitrogen oxides to form sodium nitrite and a greater or lesser quantity of sodium nitrate dependent upon the composition of the gases in the tower. In order to facilitate the absorption of the nitrogen oxides, tower 12 may contain a packing material, such as ceramic rings. Tower 12 may also be constructed so that the bottom portion serves as an oxidation chamber wherein lower oxides of nitrogen in the gases from pipe 19 are oxidized to nitrogen tetroxide or, if desired, the gases from pipe 19 may be first passed through an oxidation chamber separate from tower 12 and thence to the bottom of tower 12. The residual gases unabsorbed in the sodium carbonate solution in absorption tower 12 are vented from the tower through a pipe 21. The sodium nitrite solution formed in tower 12 is passed, as above described, through pipe 13 to the top of oxidation tower 7 and thence through towers 7, 7a and 7b where it is treated with nitrogen tetroxide gas to convert its nitrite content into nitrate in the manner described above.

The production of sodium nitrate by absorption of nitrogen oxides in sodium carbonate solution as described above, is a modification of the process described in the copending U. S. application, Serial No. 424,592, filed January 30, 1930 by M. F. Fogler and D. A. Rogers whereby the process of that application may be employed both for the production of sodium nitrate and for the production of a concentrated nitrogen oxide gas from a dilute nitrogen tetroxide gas. The process as described comprises the absorption in tower 12 of nitrogen oxides in a solution of sodium carbonate to produce a solution containing sodium nitrite, an oxidation of the nitrite content of the solution in towers 7, 7a and 7b by successively reacting on the sodium nitrite solution in a plurality of stages with a plurality of separate portions of a nitrogen tetroxide gas, each of which portions is passed through tower 7, 7a or 7b from pipes 6, 6a or 6b respectively. The sodium nitrite is thus oxidized to sodium nitrate and the unabsorbed gases are merged in header pipe 19 and their nitrogen oxide content absorbed in tower 12 in the sodium carbonate solution as described above. Intermediate two of the stages in which the sodium nitrite solution is treated for the oxidation of the nitrite, for example intermediate the treatments of the solution in towers 7 and 7a or 7a and 7b, the solution is separated from the unabsorbed gases by its passage into the sumps 10 or 10a while the solution still contains unoxidized sodium nitrite, and nitrogen oxides are recovered from the thus separated solution and passed through pipes 14 or 14a to pipe 22 whence it is withdrawn for treatment to recover liquid nitrogen tetroxide for use in the production of concentrated nitric acid. In addition to the recovery of nitrogen oxides from the sodium nitrite solution intermediate two of the stages of oxidation of the nitrite, the process as illustrated in Figs. 1 and 2 includes a recovery of nitrogen oxides from the solution obtained after its final treatment in tower 7b and the oxidation of the nitrite has been completed.

While the process as described above comprises the treatment of a nitrate-nitrite solution in three towers with nitrogen tetroxide to oxidize the nitrate, it is apparent that this treatment may be carried out employing a greater or smaller number of towers. Likewise, the absorption in sodium carbonate solution of the residual gas from the oxidation towers may be accomplished in a plurality of alkaline absorption towers instead of a single tower as in the above described process. Numerous other modifications apparent to one skilled in the art may be made in the process as described without departing from the scope of this invention. For example, instead of passing the nitrite solution from one tower to the sump of the succeeding tower in the series, the solution may be passed directly to the top of the succeeding tower and sprayed over the packing material therein.

Figure 3:
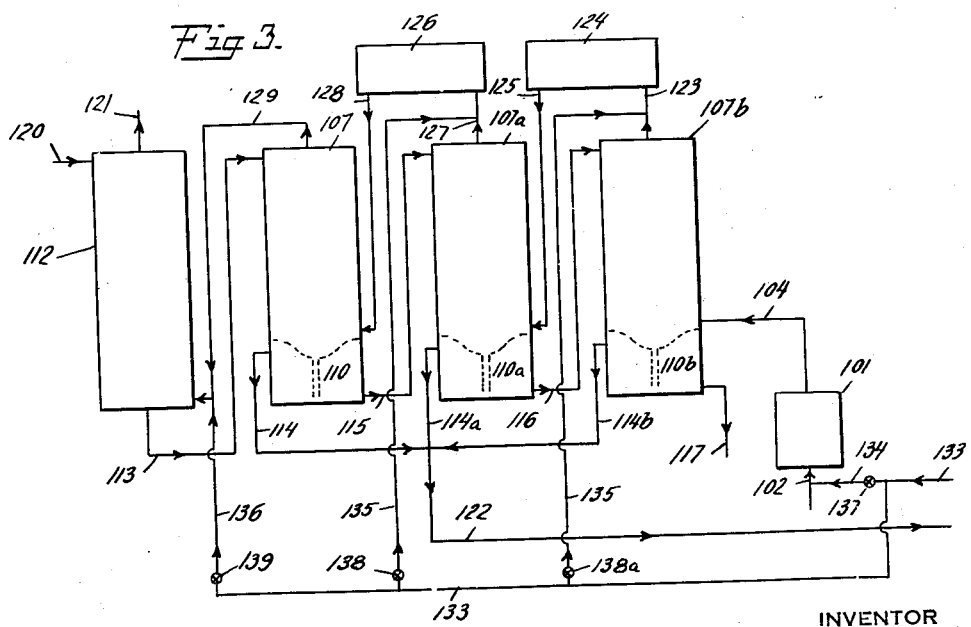
Fig. 3 illustrates a modification of the process for the production of sodium nitrate shown in Figs. 1 and 2, which may be employed in carrying out this invention.

In Fig. 3 of the drawings is illustrated a modification of the process for the production of sodium nitrate and concentrated nitrogen oxides described above and illustrated in Figs. 1 and 2. In the process of Fig. 3, both the sodium carbonate solution and the nitrogen tetroxide gas pass in series through a plurality of towers on countercurrent flow. In this figure, the numeral 112 designates an alkaline absorption tower of the type of absorption tower 12 of Fig. 1. Oxidation towers 107, 107a and 107b are likewise of the same type as oxidation towers 7, 7a and 7b of Fig. 1. A sodium carbonate solution is passed into absorption tower 112 from a pipe 120, flows downwardly through the tower and is passed from the bottom of the tower through a pipe 113 into the top of tower 107. In tower 107 the solution flows downwardly therethrough, passes into the sump 110 for removal of nitrogen oxides as described below, and thence is conveyed through pipe 115 to the top of tower 107a, through this tower to sump 110a, to the top of tower 107b by way of pipe 116 and downwardly through tower 107b to sump 110b. From sump 110b the solution is withdrawn through pipe 117 for treatment to recover sodium nitrate therefrom. In sumps 110a and 110b nitrogen oxides are recovered from the liquor.

The numeral 101 designates an oxidation chamber into which a nitrogen oxide gas is passed from a pipe 102 for treatment to convert lower oxides into nitrogen tetroxide. From chamber 101 the nitrogen tetroxide gas is passed through a pipe 104 to the bottom of tower 107b and upwardly through the tower in contact with the solution flowing therethrough. Sodium nitrite contained in the solution is oxidized to sodium nitrate and the unabsorbed gases leave tower 107b through a pipe 123 and are passed into an oxidation chamber 124 where lower oxides of nitrogen formed as a result of the oxidation of sodium nitrite in tower 107b are converted into nitrogen tetroxide. The nitrogen tetroxide gas from chamber 124 is passed through pipe 125 into the bottom of tower 107a, through the tower in contact with the solution therein and from the top of tower 107a to an oxidation chamber 126 by way of pipe 127. In oxidation chamber 126 lower oxides of nitrogen formed as a result of the oxidation of sodium nitrite in tower 107a, are converted into nitrogen tetroxide, and the nitrogen tetroxide gases pass through a pipe 128 to the bottom of tower 107. The gases pass through tower 107 in contact with the solution therein, serve for the oxidation of sodium nitrite to sodium nitrate, and the unabsorbed gases pass from the top of the tower through pipe 129 to tower 112 where their nitrogen oxide content is absorbed in the sodium carbonate solution to form a solution containing sodium nitrite. The residual unabsorbed gases are vented from tower 112 through pipe 121.

As in the case of the process first described and illustrated in Figs. 1 and 2, the solution in the sumps of towers 107, 107a and 107b contains nitrogen oxides which are given off from the solution as a concentrated gas and collect in the upper portion of each sump. This gas is withdrawn from the sumps through pipes 114, 114a and 114b and passed into a header pipe 122 through which it is conveyed to an oxidation vessel such as vessel 23 of Fig. 1, and employed in the production of concentrated nitric acid in the manner described below and illustrated in Fig. 1. The uncondensed gases from the separating and storage vessel 32 of the system shown in Fig. 1 when employing the sodium nitrate process shown in Fig. 3, are withdrawn from the vessel through a pipe 133. Pipes 134, 135, 135a and 136 communicate with pipe 133 and are provided with valves 137, 138, 138a and 139. By means of these pipes and valves the uncondensed gases may be mixed with the gases flowing through pipes 102, 123, 127 or 129 as may be desired and employed in the production of sodium nitrate.

While the production of sodium nitrate from sodium carbonate solution has been particularly described as an example, it is, of course, apparent that my invention is not limited thereto. Other alkaline liquors, such as potassium carbonate or hydroxide solutions, a solution of calcium hydroxide, or milk of lime, may be passed into absorption tower 12 and the corresponding nitrate salt withdrawn from tower 9b. Nor is it necessary to employ sodium carbonate solution in the production of sodium nitrate but instead absorption tower 12 may be supplied with a solution of sodium hydroxide.

Referring now to Figs. 1 and 2, the concentrated nitrogen oxide gas withdrawn from sumps 10, 10a and 10b is passed through pipes 14, 14a and 14b into a header pipe 22 and thence to an oxidation vessel 23 together with an oxygen containing gas from a pipe 24 which opens into pipe 22 at junction 25. Within oxidation vessel 23 the gases pass through an oxidation chamber 26, cooling coil 27, oxidation chamber 28 and cooling coil 29 in series. Oxidation chambers 26 and 28 and cooling coils 27 and 29 are contained in oxidation vessel 23 through which a cooling medium, such as cool water, is passed to remove the heat liberated by the oxidation of the concentrated nitrogen oxide gas which takes place during the passage of the gas through the oxidation chambers 26 and 28. It has been found preferable to limit the amount of oxygen mixed with the gas from towers 9, 9a and 9b to an amount such that the lower oxides of nitrogen are not completely oxidized to nitrogen tetroxide in passing through chambers 26 and 28. From cooling coil 29 the gas is passed through a refrigerating coil 30 contained in a vessel 31. A refrigerating medium, such as cold brine, is circulated through vessel 31 in contact with refrigerating coil 30 and serves to cool the nitrogen oxide gases to a low temperature and to condense therefrom liquid nitrogen tetroxide. A cooling brine at a temperature of about 2° C. is satisfactory for the condensation in coil 30 of the nitrogen tetroxide. It is, of course, apparent that another cooling medium may be employed. For example, liquid ammonia may be evaporated in vessel 31 and the cooling effect of the evaporation directly utilized for the condensation of the nitrogen tetroxide.

From refrigerating coil 30 the condensed nitrogen tetroxide, together with the uncondensed gases, is passed to a separating and storage vessel 32 where the liquid nitrogen tetroxide is separated from the uncondensed gases. These gases, which may contain a considerable proportion of oxygen, are withdrawn from vessel 32 through a pipe 33. Pipe 33 communicates with branch pipes 34, 35 and 36 which in turn communicate with pipes 2, 4 and 19 respectively. The passage of gas through pipes 34, 35 and 36 is controlled by valves 37, 38 and 39 respectively. By manipulation of these valves, the uncondensed gases from pipe 33 may be admixed with the nitrogen oxide gas employed for the production of sodium nitrate as described above in a desired manner. With valves 38 and 39 closed and valve 37 open, the uncondensed gases pass through pipe 34 to mingle with the nitrogen oxide gas passing into oxidation chamber 1 through pipe 2. With valves 37 and 38 closed and valve 39 open, the uncondensed gases may be passed through pipe 36 to mingle with the gases from oxidation towers 7, 7a and 7b which are passed through absorption tower 12 to be absorbed in the sodium carbonate solution and produce sodium nitrite. With valves 37 and 39 closed and valve 38 open, the uncondensed gases may be passed through pipe 35 to mingle with the gases passing to oxidation towers 7, 7a and 7b through pipes 4, 5, and 6, 6a and 6b. Thus, by a proper manipulation of valves 37, 38 and 39, all of the uncondensed gases may be mingled with the nitrogen oxide gases passed into oxidation chamber 1, into oxidation towers 7, 7a, and 7b or into absorption tower 12 as may be desired, or a portion of the uncondensed gases may be mingled with the nitrogen oxide gases employed in the production of the sodium nitrate solution at any two or more of the indicated points. In any case, the treatment of the uncondensed gases in oxidation towers 7, 7a and 7b and/or absorption tower 12 serves to recover from these uncondensed gases residual nitrogen oxides contained therein. The oxygen content of the gases may serve to oxidize the nitrogen oxides employed in the production of the sodium nitrate and thereby facilitate the oxidation of the sodium nitrite which takes place in towers 7, 7a and 7b and/or the absorption of the nitrogen oxides in the sodium carbonate solution which takes place in absorption tower 12.

The apparatus, diagrammatically illustrated in Figs. 1 and 2 of the drawings, which serves for the production of concentrated nitric acid from the liquid nitrogen tetroxide comprises an autoclave 40, cooler 41 and a pump 42, which are preferably constructed of chrome iron. Autoclave 40 contains a packing material such as ceramic rings. The inlet of pump 42 communicates with the bottom of autoclave 40 by way of a pipe 43 and the outlet of pump 42 communicates with cooler 41 by means of a pipe 44. A pipe 45 leads from cooler 41 into the top of autoclave 40. A pipe 46 controlled by valve 47 communicates between storage vessel 32 and pipe 43. With valve 47 and a valve 48 in pipe 44 closed, a quantity of water is admitted to pipe 45, cooler 41 and autoclave 40 from a pipe 49 by opening a valve 50. Valve 50 is then closed and valve 47 opened and a quantity of liquid nitrogen tetroxide from vessel 32 passed into pipe 43 and autoclave 40. When sufficient nitrogen tetroxide has passed valve 47, such that the proportion between the amount of nitrogen tetroxide admitted through valve 47 to the amount of water admitted through valve 50 is greater than one mol of nitrogen tetroxide ($N_2O_4$) to every one mol of water but is insufficient to form two liquid phases in the product of the ensuing reaction, valve 47 is closed. It is preferable to admit about 1.6 mols of nitrogen tetroxide for every one mol of water.

A pipe 51 controlled by a valve 52 is connected with a source of oxygen under a pressure of for example 5 to 10 atmospheres and communicates with the interior of autoclave 40. Valve 52 is opened, allowing oxygen to enter autoclave 40 and valve 48 is then opened and pump 42 put in operation to circulate the water and liquid nitrogen tetroxide from autoclave 40 through pipe 43, pump 42, pipe 44, cooler 41, and pipe 45 back to the top of autoclave 40. The mixture of liquid nitrogen tetroxide and water circulating through the autoclave is brought into intimate contact with the atmosphere of oxygen maintained therein from the source of oxygen under pressure with which pipe 51 communicates. The nitrogen tetroxide, water and oxygen react in the well known manner to form concentrated nitric acid, which reaction may be expressed by the equation $N_2O_4 + H_2O + \tfrac{1}{2}O_2 = 2HNO_3$. As noted above, an excess of nitrogen tetroxide is employed over the amount which corresponds with this equation. The reaction to produce nitric acid takes place with the evolution of heat. The recirculated liquids are therefore passed in cooler 41 in indirect contact with a cooling medium, for example cool water, to remove heat developed by the reaction and to maintain the reacting materials at a suitable temperature.

Fig. 4 of the drawings illustrates conditions with respect to temperature which it has been found preferable to employ in carrying out the reaction between liquid nitrogen tetroxide, water and oxygen in accordance with this invention. In that figure, the abscissas represent the temperature at which the reacting liquids are maintained; the ordinates represent the concentration of nitric acid in per cent by weight of $HNO_3$ obtained after the reactants have been treated for the time hereinafter noted for each of the respective curves plotted in the figure. The data represented in the drawings were obtained by carrying out the reaction with substantially pure oxygen gas admitted to an autoclave in which nitrogen tetroxide and water in the proportions of 1.6 mols of $N_2O_4$ to every one mol of $H_2O$ were undergoing reaction, and maintaining a pressure of the oxygen gas of 5 atmospheres throughout the course of the reaction. Curve A represents the results obtained when the reaction was allowed to take place for a period of 120 minutes, and curves B, C, D and E for reaction periods of 60, 45, 30 and 15 minutes respectively. The data represented by the curves of Fig. 4 shows that there is a range of temperatures within which the reaction should be carried out in order that a predetermined concentration of nitric acid may be produced in a given time and that in order to obtain nitric acid of a concentration of 90% or stronger, the most favorable temperatures lie within the range above about 30° C. and below about 50° C.

The following is an example of the manner in which the data shown in Fig. 4 are employed in determining the proper conditions under which the reaction should be carried out. Assuming that a 92% nitric acid is desired, and that the materials are to be reacted under a pressure of 5 atmospheres for a period of 45 minutes, Fig.

4 shows that a temperature of from 37½ to 43° should be maintained. Accordingly, the materials undergoing reaction would be preferably maintained at a temperature of about 40°. If, in this example, manufacturing conditions should make it possible and desirable to react the materials for a period of 60 minutes, the figure shows that a relatively wider choice of temperatures for obtaining a 92% nitric acid is available, i. e., that the reactants may be maintained within the range of temperatures of from 32° C. to 48° C. If, instead of a temperature within the indicated range being maintained, a higher or lower temperature is employed, Fig. 4 shows that the desired concentration of nitric acid will not be obtained. If higher pressures than 5 atmospheres are employed, the upper limit of the suitable temperature range is increased. For example, it has been found that when operating under a pressure of 10 atmospheres, a 92% acid may be obtained by reacting the materials for a period of 30 minutes at a temperature of 60° C. and that a 94% acid may be obtained by reacting the materials at 60° C. for a period of 60 minutes. We have found that in general, a suitable temperature range for the reaction when carried out at a pressure of 5 atmospheres is from 30 to 50° C. and that when carrying out the reaction at higher pressures, for example 10 atmospheres, a suitable temperature range is from 30° C. to 60° C.

After the reaction has proceeded for the desired length of time, valves 48 and 52 are closed and a valve 53 in a vent pipe 54 communicating with pipe 24 is opened. Upon opening valve 53 the pressure of the gases within the autoclave 40 is relieved and the gases are passed through pipes 54 and 24 and mingled with the gases coming from oxidation towers 7, 7a and 7b through pipe 22 on their way to oxidation vessel 23. The oxygen contained in the gases vented from autoclave 40 is thus employed for the oxidation of the concentrated nitrogen oxide gas from which liquid nitrogen tetroxide is subsequently condensed, and simultaneously, nitrogen tetroxide in the vented gases is recovered in refrigerating coil 30 as liquid nitrogen tetroxide for subsequent reuse.

The concentrated nitric acid reaction product in autoclave 40 contains dissolved nitrogen oxides as impurities. The impure acid is transferred to a stripper 55 by opening a valve 56 in a pipe 57 which branches from pipe 44 and leads to stripper 55, and by operating pump 42. Valve 56 is again closed and a fresh charge of water, liquid nitrogen tetroxide and oxygen may be introduced into autoclave 40 and concentrated nitric acid produced therefrom in the manner described above.

The dissolved nitrogen oxides in the nitric acid removed from the autoclave are removed in stripper 55 by contacting the acid with a gas. Any suitable gas which does not detrimentally react upon the nitric acid may be contacted with the acid in stripper 55 to free it of the nitrogen oxides. It is preferable, however, to employ oxygen gas in the following manner. The nitric acid undergoing treatment for removal of nitrogen oxides is circulated, by means of a pump 58, from the bottom of the stripper, through pipes 59 and 60, through a heater 61 and pipe 62, back to the top of stripper 55 whence it flows downwardly through the stripper. The stripper contains a packing material to facilitate an intimate contact between the nitric acid and the gas with which it is contacted. Oxygen gas is introduced into the bottom of the stripper from a pipe 63 and in its passage through the stripper countercurrently and in intimate contact with the nitric acid circulating therethrough, it picks up from the acid the nitrogen oxides dissolved therein and carries these nitrogen oxides out of the stripper by way of a pipe 64. Pipe 64 communicates with pipe 24 which leads into pipe 22 and serves to introduce the oxygen and nitrogen oxides leaving stripper 55 into the concentrated nitrogen oxide gas passing through pipe 22.

It has been found that for any given charge of nitric acid in the stripper, that the amount of oxygen which must be contacted with the nitric acid in order to substantially completely free it of its dissolved nitrogen oxides, is directly dependent upon the temperature and pressure conditions maintained in the stripper. For example, when operating at a given pressure, by increasing the temperature of the nitric acid, a less amount of oxygen need be contacted therewith to remove the nitrogen oxides. Likewise, by operating the stripper under a reduced pressure the quantity of oxygen required is reduced. It is preferable, therefore, to heat the nitric acid in heater 61 to such a temperature that the nitric acid is substantially freed from nitrogen oxides at the pressure under which the stripper is operated by passing a quantity of oxygen through stripper 55 such that it contains an amount of oxygen not greater than that required for the oxidation of the concentrated nitrogen oxide gas from oxidation towers 7, 7a and 7b which was employed in the production of that nitric acid. By thus operating stripper 55, all of the gases leaving the stripper may be passed through pipes 64 and 24 and mingled with the concentrated nitrogen oxide gas in pipe 22, and the oxygen content employed for the oxidation of that nitrogen oxide gas preliminary to its refrigeration and condensation therefrom of nitrogen tetroxide gas and the process operated continuously with complete utilization of the oxygen gas fed thereto and without necessitating the treatment of excess gas over that required for the production of the nitric acid. Any additional oxygen required for the oxidation of the concentrated nitrogen oxide gas may be supplied by the gases vented from autoclave 40 through pipe 54, and if still more oxygen is needed, this may be supplied through pipe 24 from a source of oxygen gas not shown.

It has been found, for example, that 100 lbs. of 92.5% nitric acid containing about 48% by weight of nitrogen oxides may be produced from 52.2 lbs. of a concentrated nitrogen oxide gas from oxidation towers 7, 7a and 7b. This gas required the addition of 37.2 lbs. of oxygen for its oxidation prior to condensation of liquid nitrogen tetroxide. When the acid thus produced is treated in stripper 55 with substantially pure oxygen gas at about atmospheric pressure, the acid undergoing treatment should be maintained at a temperature of 50° C. or above in order that less than 37.9 lbs. of the oxygen (less than the amount employed for the oxidation of the nitrogen oxide gas which served to produce the nitric acid) may serve to remove substantially all of the nitrogen oxides. If air instead of oxygen is used, this temperature may be lower.

After the nitric acid circulating through stripper 55 has been substantially completely freed of its content of nitrogen oxides, a valve 65 in a pipe 66 opening into pipe 60 is opened and the nitric acid product withdrawn. With valve 65 again closed, valve 56 may be opened and a new charge of nitric acid introduced into the stripper for treatment therein.

It will thus be seen that the process as described above combines the production of sodium nitrate, for example, with the production of concentrated nitric acid in which each step of the entire process is dependent upon and in turn influences and modifies each of the other steps of the process.

It is apparent to one skilled in this art that numerous changes and modifications may be made in the process described above. By suitable modifications in the apparatus and process as described, which is a batch operation in autoclave 40 and stripper 55, nitric acid may be produced and freed of its nitrogen oxides in a continuous manner. Again, while the use of oxygen gas in stripping the concentrated nitric acid of dissolved nitrogen oxides has been particularly described, the acid may be completely stripped by means of air or other inert gas, or the acid may be partially purified by treatment with oxygen gas and the residual nitrogen oxides removed by treatment with air. In such a case the oxygen gas may be returned to oxidation vessel 23 and refrigerating coil 30 for recovery of its nitrogen tetroxide content, as described above, and the air may be passed to the oxidation or absorption towers of the sodium nitrate process or otherwise treated in any desired manner. The process for the production of nitric acid has been particularly described with reference to a reaction between nitrogen tetroxide, oxygen and water, but it is apparent that instead of water, a dilute nitric acid may be treated for the production of concentrated acid in the manner described, and when in the claims reference is made to "water", it is intended that this term likewise includes within its meaning the water content of an aqueous solution such as dilute nitric acid.

Since certain changes may be made in carrying out the above process without departing from the scope of the invention, it is intended that all matter contained in the above description shall be interpreted as illustrative and not in a limiting sense.

In this specification and in the claims the term "liquid nitrogen tetroxide" has been employed to describe a liquid nitrogen oxide product. It is to be understood that this term is not limited to a liquid product consisting of substantially pure nitrogen tetroxide but that it refers to a liquid nitrogen oxide product principally consisting of nitrogen tetroxide but which may contain a greater or lesser proportion of other substances such as other nitrogen oxides, water, etc.

I claim:

1. A process for the production of a nitrate and a concentrated nitrogen oxide gas from an alkaline solution and a gas containing nitrogen tetroxide diluted with other gases which comprises treating a solution containing a nitrite with said diluted gas to convert nitrite into nitrate, separating the unabsorbed gases and the thus treated solution containing a nitrate, absorbing nitrogen oxides contained in said unabsorbed gases in an alkaline solution, and recovering from said nitrate solution nitrogen oxides contained therein.

2. A process for the production of sodium nitrate and a concentrated nitrogen oxide gas from a solution of sodium carbonate and a gas containing nitrogen tetroxide diluted with other gases which comprises treating a solution containing sodium nitrite with said diluted gas to convert sodium nitrite into sodium nitrate, separating the unabsorbed gases and the thus treated solution containing sodium nitrate, absorbing nitrogen oxides contained in said unabsorbed gases in a solution of sodium carbonate, and recovering from said solution containing sodium nitrate nitrogen oxides contained therein.

3. A process for the production of a nitrate and a concentrated nitrogen oxide gas from an alkaline solution and a gas containing nitrogen tetroxide diluted with other gases which comprises treating a solution containing a nitrite with a dilute nitrogen tetroxide gas to oxidize nitrite to nitrate, separating the unabsorbed gases and the thus treated solution while it still contains unoxidized nitrite, recovering from said solution nitrogen oxides contained therein, subsequently passing the solution in contact with a dilute nitrogen tetroxide gas to oxidize additional quantities of nitrite to nitrate, separating the unabsorbed gases and the solution, recovering from the thus separated solution nitrogen oxides contained therein, and absorbing the nitrogen oxides contained in the gases which were unabsorbed by the aforesaid solution in said alkaline solution to form the aforesaid solution containing a nitrite.

4. A process for the production of sodium nitrate and a concentrated nitrogen oxide gas from a solution of sodium carbonate and a gas containing nitrogen tetroxide diluted with other gases which comprises treating a solution containing sodium nitrite with a dilute nitrogen tetroxide gas to oxidize sodium nitrite to sodium nitrate, separating the unabsorbed gases and the thus treated solution while it still contains unoxidized sodium nitrite, recovering from said solution nitrogen oxides contained therein, subsequently passing the solution in contact with a dilute nitrogen tetroxide gas to oxidize additional quantities of nitrite to nitrate, separating the unabsorbed gases and the solution, recovering from the thus separated solution nitrogen oxides contained therein, and absorbing the nitrogen oxides contained in the gases which were unabsorbed by the aforesaid solution in said solution of sodium carbonate to form the aforesaid solution containing sodium nitrite.

5. A process for the production of a nitrate and a concentrated nitrogen oxide gas from an alkaline solution and a gas containing nitrogen tetroxide diluted with other gases which comprises oxidizing a nitrite in solution by successively reacting in stages on said solution with a plurality of separate portions of said dilute nitrogen tetroxide gas, merging the residual gases, absorbing the nitrogen oxides contained therein in said alkaline solution to produce the aforementioned solution containing a nitrite, separating intermediate two of the aforesaid stages the nitrite solution from the unabsorbed gases employed for the treatment of the solution in the first of the two stages while the solution still contains unoxidized nitrite, and recovering from said separated solution nitrogen oxides contained therein.

6. A process for the production of sodium nitrate and a concentrated nitrogen oxide gas from a solution of sodium carbonate and a gas containing nitrogen tetroxide diluted with other gases which comprises oxidizing sodium nitrite in solution by successively reacting in stages on a sodium nitrite solution with a plurality of separate portions of said dilute nitrogen tetroxide gas, merging the residual gases, absorbing the nitrogen oxides contained therein in said solution of sodium carbonate to produce the aforementioned solution of sodium nitrite, separating intermediate two of the aforesaid stages the sodium nitrite solution from the unabsorbed gases employed for the treatment of the solution in the first of the two stages while the solution still contains unoxidized sodium nitrite, and recovering from said separated solution nitrogen oxides contained therein.

7. A process for the production of a nitrate and nitric acid which comprises treating a solution containing a nitrite with a dilute nitrogen oxide gas containing nitrogen tetroxide to convert nitrite into nitrate, separating the unabsorbed gases and the solution containing a nitrate, treating the unabsorbed gases containing nitrogen oxides with an alkaline solution to produce a solution of a nitrite, recovering from the aforesaid solution containing a nitrate nitrogen oxides contained therein, oxidizing the nitrogen oxides to nitrogen tetroxide, cooling the thus treated oxides to condense nitrogen tetroxide as a liquid, separating the liquid condensate from the uncondensed gases, admixing the uncondensed gases with nitrogen oxide gas employed for the production of nitrate as hereinbefore described, and reacting the liquid nitrogen tetroxide with water and oxygen to produce nitric acid.

8. A process for the production of sodium nitrate and nitric acid which comprises treating a solution containing sodium nitrite with a gas containing nitrogen tetroxide diluted with other gases to convert sodium nitrite into sodium nitrate, separating the unabsorbed gases and the thus treated solution containing sodium nitrate, treating the unabsorbed gases containing nitrogen oxides with a solution of sodium carbonate to produce a solution of sodium nitrite, recovering from the aforesaid solution containing sodium nitrate the nitrogen oxides contained therein, oxidizing the nitrogen oxides to produce nitrogen tetroxide, cooling the thus treated oxides to condense nitrogen tetroxide as a liquid, separating the liquid condensate from the uncondensed gases, admixing the uncondensed gases with the nitrogen oxide gases employed for the production of sodium nitrate as hereinbefore described, and reacting the condensed liquid nitrogen tetroxide with water and oxygen to produce nitric acid.

9. A process for the production of sodium nitrate and nitric acid which comprises absorbing nitrogen oxides in a solution of sodium carbonate to produce a solution containing sodium nitrite, oxidizing the nitrite content of the solution by successively reacting thereon in a plurality of stages with a plurality of separate portions of a gas containing nitrogen tetroxide, merging the residual gases, absorbing the nitrogen oxides contained therein in a solution of sodium carbonate, oxidizing the nitrite content of the resulting sodium nitrite solution in the manner hereinbefore described, separating the solution subsequent to a treatment thereof with nitrogen tetroxide gases in which nitrite is oxidized to nitrate from the unabsorbed gases employed for the treatment of the solution, recovering from the separated solution containing sodium nitrate the nitrogen oxides contained therein, oxidizing the nitrogen oxides by means of an oxygen containing gas to produce nitrogen tetroxide, cooling the thus treated oxides to condense nitrogen tetroxide as a liquid, separating the liquid condensate from the uncondensed gases, admixing the uncondensed gases with the nitrogen oxide gases employed for the production of sodium nitrate as hereinbefore described, reacting the condensed liquid nitrogen tetroxide with water and oxygen to produce nitric acid containing dissolved nitrogen oxides, treating said nitric acid with an oxygen containing gas in quantity such that it contains an amount of oxygen not greater than that contained in the aforementioned oxygen containing gas and under conditions of temperature and pressure at which said nitric acid gives up substantially all of its dissolved nitrogen oxides to said gas, and employing the resulting gas mixture as the oxygen containing gas in the oxidation of a further quantity of the aforesaid nitrogen oxides recovered from a solution containing sodium nitrate.

10. A process for the production of nitric acid which comprises reacting oxygen, water and an excess of liquid nitrogen tetroxide which is insufficient to form two liquid phases in the product of the reaction.

11. A process for the production of nitric acid which comprises reacting oxygen, water and an excess of liquid nitrogen tetroxide such that there are more than about 1.5 mols of nitrogen tetroxide for every 1 mol of water but insufficient nitrogen tetroxide to form two liquid phases in the product of the reaction.

12. A process for the production of nitric acid which comprises causing oxygen, water and liquid nitrogen tetroxide to react under a pressure above about 5 atmospheres at a temperature above about 30° C. and within the range for a predetermined concentration of nitric acid and time of reaction.

13. A process for the production of nitric acid which comprises causing oxygen, water and liquid nitrogen tetroxide to react in proportions such that there is an excess of nitrogen tetroxide which is insufficient to form two liquid phases in the product of the reaction and causing said reaction to take place under a pressure above about 5 atmospheres, at a temperature above about 30° C. and within the range for a predetermined concentration of nitric acid and time of reaction.

14. A process for the production of nitric acid which comprises causing oxygen, water and liquid nitrogen tetroxide to react in proportions such that there is an excess of nitrogen tetroxide which is insufficient to form two liquid phases in the product of the reaction and causing said reaction to take place under a pressure of about 5 to 10 atmospheres and at a temperature within the range of 30° C. to 50° C.

15. A process for the production of nitric acid which comprises causing oxygen, water and liquid nitrogen tetroxide to react under a pressure of about 5 atmospheres and at a temperature within the range of about 30° C. to 50° C.

16. A process for the production of nitric acid which comprises causing oxygen, water and liquid nitrogen tetroxide to react in proportions such that there is an excess of nitrogen tetroxide which is insufficient to form two liquid phases in the product of the reaction and causing said reaction to take place under a pressure of about 5 atmospheres and at a temperature within the range of 30° C. to 50° C.

17. In a process for the production of nitric acid by reaction of nitrogen oxides with water and oxygen to form a nitric acid product containing dissolved nitrogen oxides that improvement which comprises treating said nitric acid product with an oxygen containing gas in quantity such that it contains an amount of oxygen substantially equal to that employed in the production of said nitric acid and under conditions of temperature and pressure at which said nitric acid product gives up substantially all of its dissolved nitrogen oxides to said oxygen containing gas.

18. The process for the production of nitric acid from nitrogen oxides in a lower state of oxidation than nitrogen tetroxide which comprises admixing an oxidizing gas with said nitrogen oxides to convert said oxides to nitrogen tetroxide, recovering liquid nitrogen tetroxide from the thus treated gas, reacting the liquid nitrogen tetroxide with water and oxygen to produce a nitric acid product containing dissolved nitrogen oxides, passing in contact with said nitric acid product an oxygen containing gas in quantity such that it contains an amount of oxygen not greater than that contained in the aforesaid oxidizing gas admixed with the first mentioned nitrogen oxides and under conditions of temperature and pressure at which said nitric acid product gives up substantially all of its dissolved nitrogen oxides to said gas, and employing the resulting gas mixture as the oxidizing gas in the treatment of a further quantity of the first mentioned nitrogen oxides in a lower state of oxidation than nitrogen tetroxide and recovering liquid nitrogen tetroxide, and employing the liquid nitrogen tetroxide for the production of nitric acid in the manner above described.

19. A process for the production of nitric acid which comprises treating a gas containing nitrogen oxides in a lower state of oxidation than nitrogen tetroxide with oxygen to produce nitrogen tetroxide, cooling the thus treated gas to condense said nitrogen tetroxide as a liquid, separating the liquid condensate from the uncondensed gases, treating the condensed liquid nitrogen tetroxide with water and oxygen at a temperature within the range of 30° C. to 50° C. and under a pressure of about 5 to 10 atmospheres to produce a concentrated nitric acid containing dissolved nitrogen oxides, treating said nitric acid product with a quantity of oxygen gas substantially equal to the oxygen employed for the treatment of the aforesaid gas containing nitrogen oxides and under conditions of temperature and pressure at which said nitric acid product gives up substantially all of its dissolved nitrogen oxides to said oxygen gas, and employing the resulting gas mixture for the treatment of additional quantities of the aforesaid gas containing nitrogen oxides to produce nitrogen tetroxide.

20. In a process for the production of a nitrate in which a solution containing a nitrite is oxidized in a plurality of stages by means of a dilute nitrogen tetroxide gas, the improvement said stages comprises separating intermediate said stages the solution containing a nitrate from unabsorbed gases, retaining the solution thus separated at a given stage for a period of time whereby concentrated nitrogen oxide gas is recovered from said separated solution in substantial amount.

21. In a process for the production of sodium nitrate in which a solution containing sodium nitrite is oxidized in a plurality of stages by means of a dilute nitrogen tetroxide gas, the improvement which comprises separating intermediate said stages the solution containing sodium nitrate from unabsorbed gases, and retaining the solution thus separated at a given stage for a period of time whereby concentrated nitrogen oxide gas is recovered from said separated solution in substantial amount.

22. In a process for the production of a nitrate in which a solution containing a nitrite is oxidized in a plurality of stages by means of a dilute nitrogen tetroxide gas, the improvement which comprises retaining the oxidized nitrite solution between stages for a period of time whereby a concentrated nitrogen oxide gas is recovered therefrom.

23. In a process for the production of a nitrate and a concentrated nitrogen oxide gas from an alkaline solution and a gas containing nitrogen tetroxide diluted with other gases which comprises oxidizing a nitrite in solution by successively reacting in stages on said solution with a plurality of separate portions of dilute nitrogen tetroxide gas, separating intermediate two of the aforesaid stages the nitrite solution from the unabsorbed gases employed for the treatment of the solution in the first of the two stages while the solution still contains unoxidized nitrite, and retaining the solution thus separated for a period of time whereby concentrated nitrogen oxide gas is recovered from said separated solution in substantial amount.

24. The process for the production of liquid nitrogen oxides from a gas containing nitrogen tetroxide diluted with other gases which comprises passing said dilute gas in contact with a solution containing a nitrite, recovering from the thus treated solution nitrogen oxides contained therein, and treating said recovered oxides to form liquid nitrogen oxides.

25. A process for the production of liquid nitrogen tetroxide which comprises passing a gas containing nitrogen tetroxide diluted with other gases in contact with a solution containing a nitrite, recovering from the thus treated solution nitrogen oxides contained therein, oxidizing said nitrogen oxides to nitrogen tetroxide and cooling the thus treated oxides to condense nitrogen tetroxide as a liquid.

26. A process for the production of a nitrate and liquid nitrogen tetroxide which comprises treating a solution containing a nitrite with a dilute nitrogen oxide gas containing nitrogen tetroxide to convert nitrite into nitrate, separating the unabsorbed gases and the thus treated solution containing a nitrate, treating the unabsorbed gases containing nitrogen oxides with an alkaline solution to produce a solution containing a nitrite, recovering from the aforesaid solution of a nitrate nitrogen oxides contained therein, oxidizing the nitrogen oxides to nitrogen tetroxide, and cooling the thus treated oxides to condense nitrogen tetroxide as a liquid.

27. In a process for the production of a nitrate in which a solution containing a nitrite is oxidized in a plurality of stages with a dilute nitrogen tetroxide gas, the improvement which comprises separating intermediate said stages the solution containing a nitrate from unabsorbed gases, retaining the solution thus separated at a given stage for a period of time whereby concentrated nitrogen oxide gas is recovered from said separated solution in substantial amount, and treating said concentrated gas for the recovery of liquid nitrogen oxides therefrom.

28. A process for the production of liquid nitrogen tetroxide which comprises passing a gas containing nitrogen tetroxide diluted with other gases in contact with a solution containing sodium nitrite, recovering from the thus treated solution nitrogen oxides contained therein, oxidizing said nitrogen oxides to nitrogen tetroxide and cooling the thus treated oxides to condense nitrogen tetroxide as a liquid.

29. The process for the production of liquid nitrogen oxides from a gas containing nitrogen tetroxide diluted with other gases which comprises passing said dilute gas in contact with a solution containing sodium nitrite, recovering from the thus treated solution nitrogen oxides contained therein, and treating said recovered oxides to condense liquid nitrogen oxides.

30. A process for the production of liquid nitrogen tetroxide from a gas containing nitrogen tetroxide diluted with other gases which comprises passing said diluted gas in contact with a solution containing sodium nitrite, separating the unabsorbed gases and the solution, recovering from said solution nitrogen oxides contained therein, oxidizing said nitrogen oxides to nitrogen tetroxide and cooling the thus treated oxides to condense nitrogen tetroxide as a liquid.

31. A process for the production of sodium nitrate and liquid nitrogen tetroxide which comprises treating a solution containing sodium nitrite with a gas containing nitrogen tetroxide diluted with other gases to convert sodium nitrite into sodium nitrate, treating the unabsorbed gases containing nitrogen oxides with a solution of sodium carbonate to produce a solution of sodium nitrite, recovering from the aforesaid solution containing sodium nitrate the nitrogen oxides contained therein, oxidizing the nitrogen oxides to produce nitrogen tetroxide, and cooling the thus treated oxides to condense nitrogen tetroxide as a liquid.

32. A process for the production of a concentrated nitrogen oxide gas from a gas containing nitrogen tetroxide diluted with other gases which comprises oxidizing a nitrite in solution by means of said nitrogen tetroxide gas by a treatment of the nitrite solution which consists in passing said nitrogen tetroxide gas in direct contact with said nitrite solution and then separating the unabsorbed gases and solution and recovering from the resulting solution nitrogen oxides contained therein.

33. A process for the production of a concentrated nitrogen oxide gas from a gas containing nitrogen tetroxide diluted with other gases which comprises oxidizing sodium nitrite in solution by means of said nitrogen tetroxide gas by a treatment of the sodium nitrite solution which consists in passing said nitrogen tetroxide gas in direct contact with said nitrate solution and then separating the unabsorbed gases and solution and recovering from the resulting solution nitrogen oxides contained therein.

34. A process for the production of a concentrated nitrogen oxide gas from a gas containing nitrogen tetroxide diluted with other gases which comprises oxidizing a nitrite in solution by means of said nitrogen tetroxide gas by a treatment of the nitrite solution which consists in passing said nitrogen tetroxide gas in direct contact with said nitrite solution, separating the unabsorbed gases and solution while the solution still contains unoxidized nitrite and recovering from the resulting solution nitrogen oxides contained therein.

35. A process for the production of a concentrated nitrogen oxide gas from a gas containing nitrogen tetroxide diluted with other gases which comprises oxidizing sodium nitrite in solution by means of said nitrogen tetroxide gas by a treatment of the sodium nitrite solution which consists in passing said nitrogen tetroxide gas in direct contact with said nitrite solution, separating the unabsorbed gases and solution while the solution still contains unoxidized nitrite and recovering from the resulting solution nitrogen oxides contained therein.

MAYOR FARTHING FOGLER.